Patented Apr. 17, 1951

2,549,358

UNITED STATES PATENT OFFICE 2,549,358

COMPOSITION FOR INHIBITING SAP STAIN

Leslie R. Bacon and Dwight B. Conklin, Wyandotte, Mich., assignors to Wyandotte Chemicals Corporation, Wyandotte, Mich., a corporation of Michigan No Drawing. Application June 9, 1948, Serial No. 32,045

6 Claims. (Cl. 167—38.7)

The present invention relates to a chemical composition for preventing or inhibiting sap stain and mold growth in green wood and lumber. Sap stain, often times alternatively referred to as "blue stain," is a bluish or blue blackish discoloration within the body of the wood. It is caused by the growth of fungi, one of the most prominent of which is the species Ceratostomella pilifera. Sap stain is to be differentiated from mold growths which occur on the surface of the wood and which vary widely in color according to the characteristics of the several organisms which may develop.

A great many chemical compositions for inhibiting sap stain or mold growth in green wood have heretofore been devised. However, in most cases it has been found that such compositions were not capable of inhibiting both sap stain and mold growth. The composition of U. S. Patent No. 2,392,987 is capable of inhibiting both sap stain and mold growth.

Our present invention constitutes an improvement in the composition of the aforesaid patent, in that we have discovered certain organic compounds which upon addition to the parent composition consisting of borax, modified soda and sodium pentachlorophenate, result in a still greater sap stain preventive action, and impart a synergistic effect to our new compositions as a whole.

The composition of U. S. Patent No. 2,392,987 is disclosed as comprising by weight, 20–50% borax ($Na_2B_4O_7.10H_2O$), 30–50% modified soda which is a molecular combination of sodium carbonate and sodium bicarbonate corresponding substantially to the empirical formula:

$$Na_2CO_3.1.6NaHCO_3.2H_2O$$

and 20–40% sodium pentachlorophenate. We have discovered, that by incorporating 35–55 parts by weight with said patented composition on the basis of 100 parts by weight total composition, of a higher alkyl group-polar hydrophilic group compound selected from the group consisting of water soluble primary higher alkylamine salts (e. g. acetates and chlorides) and sodium hydrocarbon sulfonates of the "M. P. 189" proprietary compound type (corresponding to formula $RSO_3Na$ where R is an alkyl group having an average of 15 carbon atoms), that even a still greater control or inhibition of sap stain can be obtained. In other words, by incorporating one of these last named additive agents in the parent mixture of borax, modified soda and sodium pentachlorophenate, not only is mold growth completely prevented, but the sap stain inhibition action is greatly improved. This result was not to be expected, inasmuch as compounds such as the primary alkylamine acetates alone, for example, resulted in mold growth when used at 1% concentration.

The compositions of our invention are preferably employed by being made up in an aqueous solution of 5–20 pounds of composition per 100 gallons of water. The green wood or lumber to be treated is then dipped or immersed in such aqueous solution and after dipping, stacked in the customary manner in the lumber yard and allowed to air dry for the usual period of three or four months.

Formulation ranges of compositions embodying the principle of our invention are as follows:

| Ingredients | Per Cent by Weight, Solids Basis |
|---|---|
| Borax | 10–30 |
| Modified Soda | 15–30 |
| Sodium Pentachlorophenate | 10–25 |
| Higher Alkyl (8+C atoms)-Polar Hydrophilic Group Compound | 35–55 |

An exemplary formulation, omitting the borax and modified soda ingredients, is as follows:

| Ingredients | Per Cent by Weight |
|---|---|
| Sodium Pentachlorophenate | 20 |
| Primary Alkylamine Acetate ($C_{12}$–$C_{14}$ alkyl group) | 80 |

Compositions made according to the above stated formulation ranges were made up and subjected to the following test:

Test specimens of southern yellow pine in the form of circular blocks transversely cut from the sapwood of young trees were inoculated with a viable culture of the fungus Ceratostomella pilifera. Four of such specimen blocks were used for each test composition. The test compositions were made up into aqueous solutions in the concentration as noted and applied to the fungus-inoculated blocks. Blocks were then maintained at a temperature of 82° F. and approximately 100% relative humidity for an incubation period of five weeks. At the end of such five weeks period, the area of sapwood stained on both the top and bottom surfaces of the four test blocks was measured and the average thereof noted. Observations were made as to the degree of mold growth on the surface of the blocks. These test results are tabulated as follows:

| Composition | Per Cent Ingredient Solids Basis | Per Cent Concentration in H$_2$O Solution | Avg. Per Cent Sapwood Stained | Mold Growth |
|---|---|---|---|---|
| No. 1: | | | | |
| (Control) | | 0.625 | 100.0 | None |
| Borax | 50 | | | |
| Modified Soda | 30 | | | |
| Sodium Pentachlorophenate | 20 | | | |
| No. 1 (Control) | Same as above | 1.25 | 68.1 | None |
| No. 1 (Control) | Same as above | 2.50 | 0.0 | None |
| No. 2: | | 1.125 | 3.5 | None |
| Borax | 28 | | | |
| Modified Soda | 17 | | | |
| Sodium Pentachlorophenate | 11 | | | |
| Primary alkylamine acetate | 44 | | | |
| (8-18 C atom alkyl group) | | | | |
| No. 3: | | 1.125 | 0.0 | None |
| Borax | 28 | | | |
| Modified Soda | 17 | | | |
| Sodium Pentachlorophenate | 11 | | | |
| Primary alkylamine acetate | 44 | | | |
| (12-14 C atom alkyl group) | | | | |
| No. 4: | | 1.125 | 0.0 | None |
| Borax | 28 | | | |
| Modified Soda | 17 | | | |
| Sodium Pentachlorophenate | 11 | | | |
| "M. P. 189" (proprietary higher alkyl sodium sulfonate) | 44 | | | |
| No. 5: | | 0.625 | 0.0 | None |
| Sodium Pentachlorophenate | 20 | | | |
| Primary alkylamine acetate | 80 | | | |
| (12-14 C atom alkyl group) | | | | |

The primary alkylamine acetate employed in composition No. 2 in the foregoing table was synthesized from glacial acetic acid and a primary alkylamine (commercially available under the trade name "Armeen C") whose alkyl groups are derived from the fatty acids such as found in coconut oil. The primary alkylamine in compositions Nos. 3 and 5 were similarly made from a mixture of primary alkylamines (commercially available under the trade name "Armeen 12-D"), whose alkyl groups are derived from a more highly refined fatty acid mixture.

The borax and modified soda employed as ingredients in the compositions given in the foregoing table, contained some water of hydration or of molecular combination, i. e. Na$_2$B$_4$O$_7$.10H$_2$O and Na$_2$CO$_3$.1.6NaHCO$_3$.2H$_2$O. Our invention however is equally well operable when one or more of the ingredients are employed in the anhydrous form. Thus, in the appended claims, the definition of the ingredients of the composition should be understood as including the hydrated and anhydrous forms as equivalents.

Equivalent modes of practicing our invention may be followed provided that they are within the scope and purview of the appended claims.

We, therefore, distinctly claim and particularly point out as our invention:

1. A composition for inhibiting sap stain and mold growth in green wood comprising a mixture of 10-30% borax, 15-30% modified soda, and 10-25% sodium pentachlorophenate, and 35-55% of a mixture of primary alkylamine salts whose alkyl portion contains at least 8 carbon atoms.

2. A composition for inhibiting sap stain and mold growth in green wood comprising 10-30% borax, 15-30% modified soda, 10-25% sodium pentachlorophenate, and 35-55% of a mixture of primary alkylamine acetates whose alkyl groups are derived from fatty acids of 8-18 carbon atoms content.

3. A composition for inhibiting sap stain and mold growth in green wood consisting essentially of 28% by weight borax, 17% modified soda, 11% sodium pentachlorophenate and 44% of a mixture of primary alkylamine acetates whose alkyl groups are derived from fatty acids of 12-14 carbon atoms content.

4. A composition for inhibiting sap stain and mold growth in green wood consisting essentially of 28% by weight borax, 17% modified soda, 11% sodium pentachlorophenate and 44% of a mixture of primary alkylamine acetates whose alkyl groups are derived from fatty acids of 8-18 carbon atoms content.

5. An aqueous solution bath for treating green wood to inhibit sap stain and mold growth comprising 5-20 pounds per 100 gallons of water of the composition of claim 1.

6. An aqueous solution bath for treating green wood to inhibit sap stain and mold growth comprising 5-20 pounds per 100 gallons of water of the composition of claim 2.

LESLIE R. BACON.
DWIGHT B. CONKLIN.

REFERENCES CITED

The following references are of record in the file of this patent:

UNITED STATES PATENTS

| Number | Name | Date |
|---|---|---|
| 2,322,633 | Hitchens | June 22, 1943 |
| 2,392,987 | Hill | Jan. 15, 1946 |